United States Patent
Oh et al.

(10) Patent No.: US 9,099,755 B2
(45) Date of Patent: Aug. 4, 2015

(54) LITHIUM SECONDARY BATTERY

(75) Inventors: Jeon Keun Oh, Daejeon (KR); Eun Joo Lee, Daejeon (KR); Jae Myoung Lee, Gyeonggi-do (KR); Ghi Soo Han, Seoul (KR)

(73) Assignee: SK Innovation Co., Ltd., Seoul (KR)

( * ) Notice: Subject to any disclaimer, the term of this patent is extended or adjusted under 35 U.S.C. 154(b) by 1059 days.

(21) Appl. No.: 12/522,596

(22) PCT Filed: Jan. 24, 2008

(86) PCT No.: PCT/KR2008/000446
§ 371 (c)(1),
(2), (4) Date: Jul. 9, 2009

(87) PCT Pub. No.: WO2008/091118
PCT Pub. Date: Jul. 31, 2008

(65) Prior Publication Data
US 2009/0297944 A1    Dec. 3, 2009

(30) Foreign Application Priority Data

Jan. 25, 2007   (KR) .................... 10-2007-0007916

(51) Int. Cl.
*H01M 4/70* (2006.01)
*H01M 4/02* (2006.01)
*H01M 2/06* (2006.01)
*H01M 2/22* (2006.01)
*H01M 2/26* (2006.01)
*H01M 2/30* (2006.01)
*H01M 10/0585* (2010.01)
(Continued)

(52) U.S. Cl.
CPC ............ *H01M 10/0436* (2013.01); *H01M 2/26* (2013.01); *H01M 2/266* (2013.01); *H01M 2/0217* (2013.01); *H01M 2/0257* (2013.01); *H01M 2/0275* (2013.01)

(58) Field of Classification Search
None
See application file for complete search history.

(56) References Cited

U.S. PATENT DOCUMENTS 6,106,975 A * 8/2000 Watanabe et al. ............. 429/211
6,447,950 B1   9/2002 Iijima
6,740,447 B1   5/2004 Keshishian
(Continued)

FOREIGN PATENT DOCUMENTS

JP        1-124660      8/1989
JP     2003-288882    10/2003
(Continued)

OTHER PUBLICATIONS

Daniel, Materials and Processing for Lithium-Ion Batteries, 43-48 JOM 60/9 (2008).*

*Primary Examiner* — Yoshitoshi Takeuchi
(74) *Attorney, Agent, or Firm* — Richard M. Klein; Fay Sharpe LLP

(57) ABSTRACT

This invention relates to a lithium secondary battery, the tab shape of which is improved, thus increasing the safety and improving the electrical properties thereof. The lithium secondary battery includes an electrode group composed of a first electrode, a second electrode, and a separator disposed between the first electrode and the second electrode, a first electrode tab connected to the first electrode, and a second electrode tab connected to the second electrode. The first electrode tab includes a first portion connected to the first electrode and a second portion, which is not the first portion, the width of the first portion being less than the width of the second portion.

6 Claims, 2 Drawing Sheets

(51) Int. Cl.
  *H01M 10/04* (2006.01)
  *H01M 2/02* (2006.01)

(56) References Cited

U.S. PATENT DOCUMENTS

| | | |
|---|---|---|
| 6,790,557 B2 | 9/2004 | Xing et al. |
| 2002/0094478 A1 | 7/2002 | Holland |
| 2004/0126650 A1* | 7/2004 | Kim ................................ 429/61 |
| 2006/0269831 A1 | 11/2006 | Kim |
| 2008/0070102 A1* | 3/2008 | Watanabe et al. ............... 429/91 |

FOREIGN PATENT DOCUMENTS

| | | | |
|---|---|---|---|
| JP | 2005-259601 | 9/2005 | |
| JP | 2006-196428 | 7/2006 | |
| WO | 2005/117163 A1 | 12/2005 | |
| WO | WO 2005/117163 | * 12/2005 | .............. H01M 2/10 |

\* cited by examiner

LITHIUM SECONDARY BATTERY

TECHNICAL FIELD

The present invention relates to a lithium secondary battery, and more particularly, to a lithium secondary battery, the tab shape of which is improved, thus increasing the safety and improving the electrical properties thereof.

BACKGROUND ART

Generally, a chemical battery is a battery composed of a positive electrode, a negative electrode, and an electrolyte to thus generate electrical energy using a chemical reaction, and is classified into a primary battery, which is disposable, and a secondary battery, which is chargeable and dischargeable and thus is repeatedly usable. The use of the secondary battery is gradually increasing thanks to the advantage of its chargeable and dischargeable property.

Among secondary batteries, a lithium secondary battery has high energy density per unit weight, and thus is widely used as a power source in electronic communication devices and for high-power hybrid vehicles.

The lithium secondary battery includes an electrode group, composed of a positive electrode, a negative electrode, and a separator disposed between the positive and negative electrodes, and a positive electrode tab and a negative electrode tab respectively connected to the positive electrode and the negative electrode and having a rectangular shape with a predetermined width.

The positive electrode and the negative electrode are formed by applying an active material on a collector, and the positive electrode tab and the negative electrode tab are connected to respective portions of the positive electrode and the negative electrode on which the active material is not applied. On the positive electrode and the negative electrode, the portion on which the active material is applied and the portion on which no active material is applied are formed together, thus forming an active material border therebetween.

The active material is applied through a coating process, and is typically applied so that it is thicker on the active material border. Thus, there is a problem in which the entire electrode warps due to the application of the active material.

In order to prevent this problem, an electrode-pressing process may be conducted. In this case, however, wrinkles may be generated near the active material border of the electrode. The generation of wrinkles may be relatively severe on an electrode composed of a material having high elongation.

When the electrode warps or wrinkles, in the electrode group in which a plurality of electrodes is stacked, the electrodes are not uniformly brought into close contact with each other but have gaps therebetween, undesirably incurring non-uniform contact of the electrodes.

Thereby, the entire electrode group may be distorted, and the battery reaction may be non-uniformly generated. For this reason, the lifetime of the lithium secondary battery may be decreased and the electrical properties thereof may be deteriorated.

As acceleration of non-uniformity is caused by the areas of the electrodes at which the electrodes are not uniformly brought into close contact with each other, lithium may be deposited, negatively affecting the safety of the lithium secondary battery.

DISCLOSURE

Technical Problem

Accordingly, the present invention has been devised to solve the problems encountered in the related art, and provides a lithium secondary battery, which has excellent electrical properties and safety and a long lifetime.

Technical Solution

According to the present invention, a lithium secondary battery may include an electrode group composed of a first electrode, a second electrode, and a separator disposed between the first electrode and the second electrode, a first electrode tab connected to the first electrode, and a second electrode tab connected to the second electrode. The first electrode tab may include a first portion connected to the first electrode and a second portion, which is not the first portion, and the width of the first portion may be less than the width of the second portion.

The first electrode may have a tab junction which is protruding therefrom in order to be connected to the first portion.

The width of the tab junction of the first electrode may be less than the width of the second portion.

The ratio of the width of the first portion to the width of the second portion may range from 0.35 to 0.6.

The second portion may have a protruding shape that extends laterally in one direction with respect to the first portion.

The lithium secondary battery may further include a battery case for enclosing and sealing the electrode group while exposing ends of the first electrode tab and the second electrode tab, wherein the adhesion portion of the battery case may be located on the second portion.

The first electrode may be a cathode, and may have higher elongation than that of the second electrode.

The second electrode tab may include a third portion connected to the second electrode and a fourth portion, which is not the third portion, and the width of the third portion may be less than the width of the fourth portion.

Advantageous Effects

As described hereinbefore, the present invention provides a lithium secondary battery, in which a positive electrode tab or a negative electrode tab, connected to a positive electrode or a negative electrode, has two portions having different widths from each other, thus simultaneously improving different properties.

Specifically, because a first portion or a third portion connected to the electrode is formed to have a relatively small width, warping or wrinkling of the electrode may be effectively prevented. Thus, in an electrode group, electrodes are uniformly brought into close contact with each other, effectively preventing the distortion of the electrode group and the deposition of lithium and ensuring a uniform battery reaction. Consequently, the safety and lifetime of the lithium secondary battery may be increased, and the electrical properties thereof may be improved.

Further, a second portion or a fourth portion, which is not connected to the electrode, is formed to have a relatively large width, thus efficiently transferring electrical energy from the electrode group and improving heating properties, ultimately ensuring stable operation of the lithium secondary battery.

Although the preferred embodiment of the present invention has been disclosed for illustrative purposes, those skilled in the art will appreciate that various modifications, additions and substitutions are possible within the technical spirit of the invention.

Figure 1:
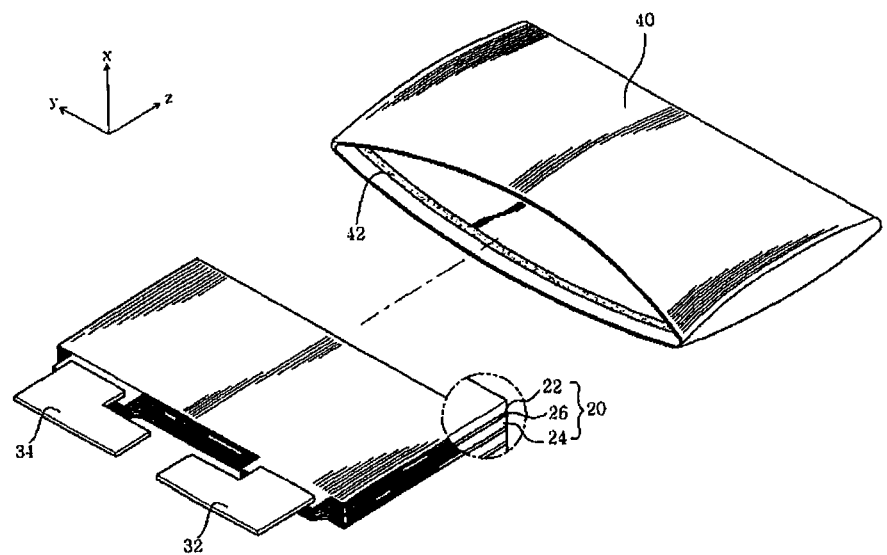
FIG. 1 is a perspective view illustrating the lithium secondary battery according to the present invention.

<Description of the Reference Numerals in the Drawings>

| | |
|---|---|
| 10: lithium secondary battery | 20: electrode group |
| 22: positive electrode | 24: negative electrode |
| 26: separator | 32: positive electrode tab |
| 34: negative electrode tab | 40: case |
| 42: adhesion portion | |

BEST MODE

Hereinafter, a detailed description will be given of a lithium secondary battery according to the present invention, with reference to the appended drawings.

Figure 2:
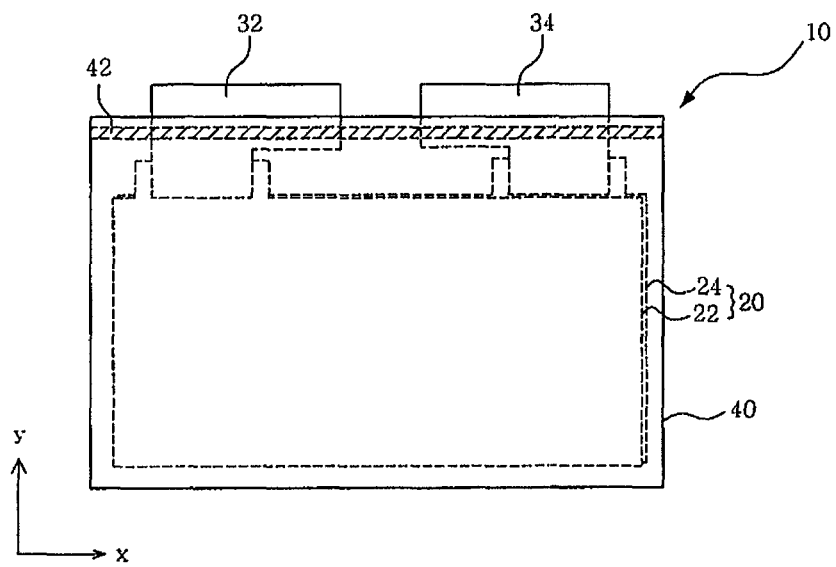
FIG. 2 is a top plan view illustrating the lithium secondary battery according to the present invention.

FIG. 1 is a perspective view illustrating the lithium secondary battery according to the present invention, and FIG. 2 is a top plan view illustrating the lithium secondary battery according to the present invention.

As illustrated in FIGS. 1 and 2, the lithium secondary battery 10 according to the present invention includes an electrode group 20 consisting of a first electrode 22 (cathode; hereinafter, referred to as a "positive electrode"), a second electrode 24 (anode; hereinafter, referred to as a "negative electrode"), and a separator 26 (FIG. 1) disposed between the positive electrode and the negative electrode, a first electrode tab 32 (hereinafter, referred to as a "positive electrode tab") and a second electrode tab 34 (hereinafter, referred to as a "negative electrode tab") respectively connected to the positive electrode 22 and the negative electrode 24, and a battery case 40 for receiving the electrode group 20, the positive electrode tab 32, and the negative electrode tab 34 therein while exposing the ends of the positive electrode tab 32 and the negative electrode tab 34.

Depending on the type of battery, an electrolyte in a liquid state may be charged in the battery case 40, and the separator may play a role as the electrolyte. Alternatively, after an electrolyte in a liquid state is charged in the battery case 40, a polymerizable component may be added thereto, ultimately obtaining the electrolyte in a polymeric state.

In the present invention, a stacked battery, in which a plurality of positive electrodes 22 and a plurality of negative electrodes 24 are stacked, is exemplary, but the present invention is not limited thereto. Alternatively, a spiral battery, in which a positive electrode and a negative electrode are wound in a spiral form while a separator is disposed therebetween, may be applied to the present invention, and falls within the scope of the present invention.

In the present invention, the battery case 40 is provided in the form of a pouch which is adhered using an adhesion portion 42, but the present invention is not limited thereto. As the battery case, a circular case or a rectangular case formed of metal or plastic may be used, both of which fall within the scope of the present invention.

Figure 3:
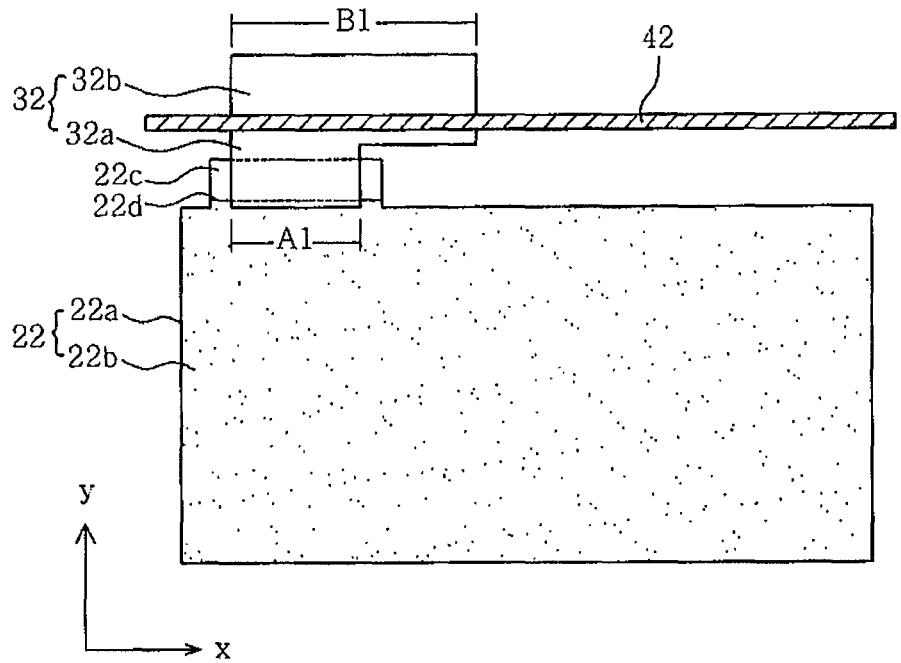
FIG. 3 is a top plan view illustrating the positive electrode and the positive electrode tab of the lithium secondary battery according to the present invention.
Figure 4:
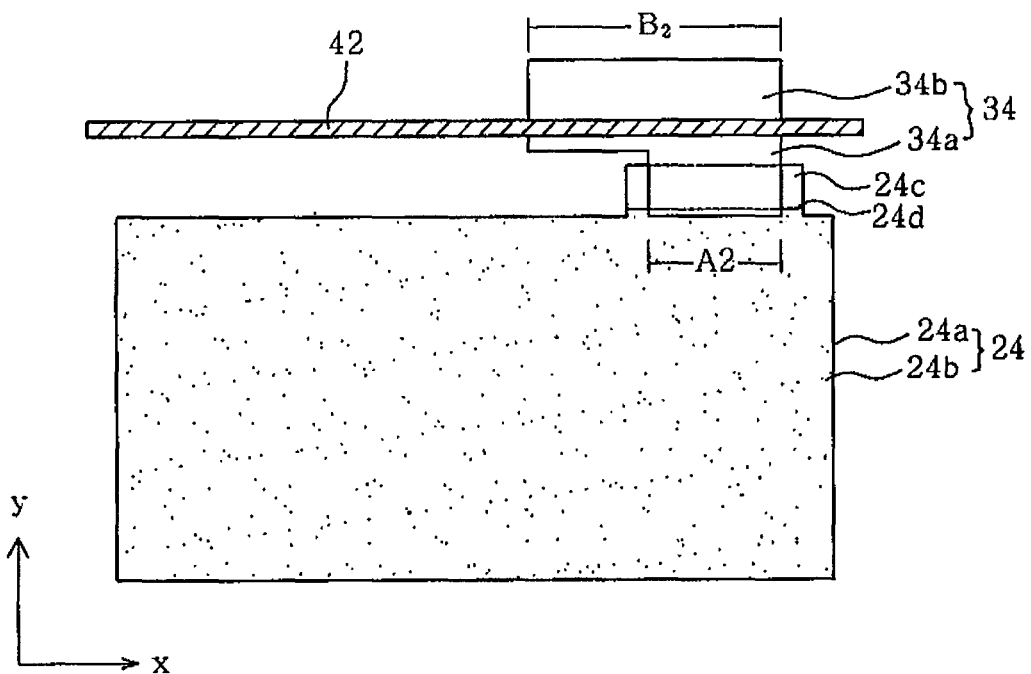
FIG. 4 is a top plan view illustrating the negative electrode and the negative electrode tab of the lithium secondary battery according to the present invention.

Referring to FIGS. 3 and 4 with FIGS. 1 and 2, the electrode group 20, the positive electrode tab 32, and the negative electrode tab 34 of the lithium secondary battery 10 according to the present invention are described in detail below.

FIG. 3 is a top plan view illustrating the positive electrode 22 and the positive electrode tab 32 of the lithium secondary battery according to the present invention, and FIG. 4 is a top plan view illustrating the negative electrode 24 and the negative electrode tab 34 of the lithium secondary battery according to the present invention. For clearer understanding thereof, the battery case 40 is not shown in FIGS. 3 and 4.

With reference to FIG. 3, the positive electrode 22 according to the present invention includes a collector 22a formed of a conductive material and a positive electrode active material 22b formed on at least one surface of the collector 22a. The collector 22a of the positive electrode 22 may be formed of aluminum and the positive electrode active material 22b may be formed of lithium-based transition metal oxide. However, the present invention is not limited thereto, and the collector 22a and the positive electrode active material 22b of the positive electrode 22 may be formed of materials other than the above exemplified materials, which remains within the scope of the present invention.

Only the collector 22a protrudes outward from the long side of the positive electrode 22, thus forming a positive electrode tab junction 22c. The positive electrode tab junction 22c, to which the positive electrode tab 32 is connected, is preferably composed of an uncoated portion, on which the positive electrode active material 22b is not formed, so that the positive electrode tab 32 is efficiently connected to the positive electrode 22 through welding.

Because the positive electrode tab junction 22c is composed of an uncoated portion, in the positive electrode 22, an active material border 22d is present between the portion on which the positive electrode active material 22b is formed and the portion on which the positive electrode active material 22b is not formed. The active material border 22d is located on the positive electrode tab junction 22c in order to minimize the length thereof. The positive electrode tab 32 connected to the positive electrode 22 includes a first portion 32a, which is connected to the positive electrode tab junction 22c, and a second portion 32b, which is not connected to the positive electrode tab junction 22c. The positive electrode tab 32 may be formed of aluminum, but the present invention is not limited thereto. It goes without saying that the positive electrode tab 32 is formed of a material other than aluminum.

The width A1 of the first portion 32a of the positive electrode tab 32 is formed to be less than the width A2 of the second portion 32b of the positive electrode tab 32. The width of the positive electrode tab junction 22c is almost the same as the width A1 of the first portion 32a of the positive electrode tab 32, which is connected thereto, and thus the width of the positive electrode tab junction 22c is formed to be less than the width B1 of the second portion 32b of the positive electrode tab 32.

In the present invention, as the width A1 of the first portion 32a of the positive electrode tab 32 is decreased, the width of the positive electrode tab junction 22c of the positive electrode 22 to which the positive electrode tab 32 is connected may also decrease. Accordingly, the length of the active material border 22d formed on the positive electrode tab junction 32c may be considerably decreased. As the active material border 22d increases in length, the positive electrode 22 easily warps or wrinkles. In the present invention, this length is greatly reduced, thereby minimizing the problems of the warping or wrinkling of the positive electrode 22.

Therefore, the problem in which the entire electrode group 20 having the pluralities of the positive electrodes 22 and the negative electrodes 24 is distorted may be prevented, and furthermore, the positive electrodes 22 and the negative electrodes 24 may be uniformly brought into close contact with each other, thus causing a uniform battery reaction. Accordingly, the safety of the lithium secondary battery 10 may be increased, and the lifetime thereof may be lengthened.

The width B1 of the second portion 32a of the positive electrode tab 32 is formed to be relatively large, so that the electrical energy generated from the electrode group 20 is efficiently transferred through the second portion 32a. Upon the operation of the lithium secondary battery 10, heat may be emitted over a large area, thus improving heating properties.

In the present invention, the positive electrode tab 32 is formed so that the first portion 32a and the second portion 32b have different widths from each other, thus simultaneously minimizing the warping or wrinkling of the positive electrode 22 and improving the electrical properties and the heating properties of the lithium secondary battery.

The ratio (A1/B1) of the width A1 of the first portion 32a to the width B1 of the second portion 32b preferably ranges from 0.35 to 0.6. When the ratio (A1/B1) is less than 0.35, the width A1 of the first portion 32a becomes too small, undesirably incurring a problem of distortion of the shape of the positive electrode tab 32. On the other hand, when the ratio (A1/B1) exceeds 0.6, the active material border 22d is lengthened, in which case the electrode may undesirably warp or wrinkle.

Likewise, referring to FIG. 4, the negative electrode 24 includes a collector 24a formed of a conductive material and a negative electrode active material 24b formed on at least one surface of the collector 24a. The collector 24a of the negative electrode 24 may be formed of copper, and the negative electrode active material 24b may be formed of carbonaceous material. However, the present invention is not limited thereto, and the collector 24a and the negative electrode active material 24b of the negative electrode 24 may be formed of materials other than the above mentioned materials, which remains within the scope of the present invention.

Only the collector 24a protrudes outward from the long side of the negative electrode 24, thus forming a negative electrode tab junction 24c. The negative electrode tab junction 24c, to which the negative electrode tab 34 is connected, is preferably composed of an uncoated portion, on which the negative electrode active material 24b is not formed, so that the negative electrode tab 34 is efficiently connected to the negative electrode 24 through welding.

Because the negative electrode tab junction 24c is formed of an uncoated portion, in the negative electrode 24, an active material border 24d is present between the portion on which the negative electrode active material 24b is formed and the portion on which the negative electrode active material 24b is not formed. In the present invention, the active material border 24d is located on the negative electrode tab junction 24c in order to minimize the length thereof.

The negative electrode tab 34 connected to the negative electrode 24 includes a third portion 34a, connected to the negative electrode tab junction 24c, and a fourth portion 34b, which is not connected to the negative electrode tab junction 24c. The negative electrode tab 34 may be formed of copper, nickel, or nickel-plated copper. However, the present invention is not limited thereto, and the negative electrode tab 34 may be formed of a material other than the above mentioned material.

The width A2 of the third portion 34a and the width of the negative electrode tab junction 24c are formed to be less than the width B2 of the fourth portion 34b.

The ratio (A2/B2) of the width A2 of the third portion 34a to the width B2 of the fourth portion 34b preferably ranges from 0.35 to 0.6. The ratio (A2/B2) is set to the above range, in consideration of the problem of heating of the lithium secondary battery 10 while stably forming the negative electrode tab 34, as in the positive electrode tab 32.

In the present invention, the negative electrode tab 34 is formed so that the third portion 34a and the fourth portion 34b have different widths from each other, thus simultaneously minimizing the warping or wrinkling problem of the negative electrode 24 and improving the electrical properties and the heating properties of the lithium secondary battery 10.

In the present invention, the adhesion portion 42 may be formed on the second portion 32b of the positive electrode tab 32 and the fourth portion 34d of the negative electrode tab 34.

Both the positive electrode tab 32 and the negative electrode tab 34 may have two portions having different widths from each other. Alternatively, only one of the positive electrode tab 32 and the negative electrode tab 34 may have two portions having different widths from each other. In the latter case, the configuration in which the two portions have different widths from each other may preferably be provided to the one of the positive electrode 22 and the negative electrode 24, which is formed of a material having higher elongation to undesirably warp or wrinkle. For example, when the positive electrode 22 is formed of aluminum and the negative electrode 24 is formed of copper, the positive electrode tab 32 may have the above configuration.

In the drawing, the second portion 32b is illustrated as having a protruding shape that extends laterally in one direction with respect to the first portion 32a so that the width A1 of the first portion 32a is less than the width B1 of the second portion 32b, but the present invention is not limited thereto. Likewise, in the drawing, the fourth portion 34b is illustrated as having a protruding shape that extends laterally in one direction with respect to the third portion 34a, but the present invention is not limited thereto.

Further, the positive electrode tab junction 22c and the negative electrode tab junction 24c are illustrated as having a shape that protrudes from the long sides of the positive electrode 22 and the negative electrode 24, respectively, but the present invention is not limited thereto. Alternatively, the positive electrode tab junction 22c and the negative electrode tab junction 24c may be variously modified, for example, they may be formed on the short sides of the positive electrode 22 and the negative electrode 24 or may not have a protruding shape.

The invention claimed is:

1. A lithium secondary battery, comprising:
   an electrode group, including a first electrode, a second electrode, and a separator disposed between the first electrode and the second electrode;
   a first electrode tab connected to the first electrode; and
   a second electrode tab connected to the second electrode, wherein the first electrode tab includes a first portion connected to the first electrode and a second portion, and a width of the first portion is less than a width of the second portion,
   wherein the first electrode has a tab junction protruding from a side of the first electrode to be connected to the first portion, and the tab junction is an uncoated portion on which electrode active material is not coated, the tab junction having an active material border between a portion on which the electrode active material is formed and a portion on which the electrode active material is not formed, the width of the tab junction is equal to or larger than the width of the first portion, the width of the tab junction of the first electrode is less than a width of the second portion, and a ratio of the width of the first portion to the width of the second portion ranges from 0.35 to 0.6.

2. The lithium secondary battery according to claim 1, wherein the second portion has a protruding shape that extends laterally in one direction with respect to the first portion.

3. The lithium secondary battery according to claim 1, further comprising a battery case required to enclose and seal the electrode group while exposing ends of the first electrode tab and the second electrode tab, wherein an adhesion portion of the battery case is located on the second portion.

4. The lithium secondary battery according to claim 1, wherein the first electrode is a cathode.

5. The lithium secondary battery according to claim 1, wherein a material of the first electrode has a higher elongation capability than that of the second electrode.

6. The lithium secondary battery according to claim 1, wherein the second electrode tab comprises a third portion connected to the second electrode and a fourth portion, which is not the third portion, and a width of the third portion is less than a width of the fourth portion.

* * * * *